United States Patent
Sakurai

(10) Patent No.: US 9,217,491 B2
(45) Date of Patent: Dec. 22, 2015

(54) REVERSE SHIFT DEVICE IN TRANSMISSION

(75) Inventor: Atsushi Sakurai, Nishio (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 72 days.

(21) Appl. No.: 14/115,899

(22) PCT Filed: May 11, 2012

(86) PCT No.: PCT/JP2012/062102
§ 371 (c)(1),
(2), (4) Date: Nov. 6, 2013

(87) PCT Pub. No.: WO2012/153830
PCT Pub. Date: Nov. 15, 2012

(65) Prior Publication Data
US 2014/0123792 A1 May 8, 2014

(30) Foreign Application Priority Data

May 11, 2011 (JP) ................... 2011-106419

(51) Int. Cl.
*F16H 3/14* (2006.01)
*F16H 63/30* (2006.01)
*F16H 3/091* (2006.01)

(52) U.S. Cl.
CPC ................ *F16H 3/14* (2013.01); *F16H 63/302* (2013.01); *F16H 3/0915* (2013.01); *Y10T 74/19233* (2015.01)

(58) Field of Classification Search
CPC .................................. F16H 63/302; F16H 3/14
USPC .................. 74/473.1, 473.27, 473.28, 473.36, 74/473.37, 100.1
See application file for complete search history.

(56) References Cited

U.S. PATENT DOCUMENTS 4,625,577 A * 12/1986 Ashikawa et al. ......... 74/473.25
4,827,792 A    5/1989 Uetake et al.
(Continued)

FOREIGN PATENT DOCUMENTS

CN    2367809 Y    3/2000
FR    1 409 970 A1    9/1965
(Continued)

OTHER PUBLICATIONS

International Search Report and Written Opinion (with English Translation), International Application No. PCT/JP2012/062102, dated Jul. 31, 2013 (9 pages).

(Continued)

*Primary Examiner* — William C Joyce
*Assistant Examiner* — Thomas Magnuson
(74) *Attorney, Agent, or Firm* — Burr & Brown, PLLC

(57) ABSTRACT

A reverse arm is pivoted by a driving pin of a reverse fork inserted into a driven hole thereof, and the reverse arm thereby moves an idle gear in an axial direction, whereby the idle gear is engaged with and disengaged from a driving gear and a driven gear of a reverse gear train. The outside diameter of the driving pin is smaller than the width between opposed flat inner side surfaces of the driven hole of the reverse arm; thus, a gap is formed between the driving pin and the inner side surfaces. A jump-over mechanism JO is provided between the reverse arm and a transmission casing for elastically urging the reverse arm outward away from a predetermined intermediate position within the pivoting range of the reverse arm and brings the driving pin in contact with one of the inner side surfaces of the driven hole.

5 Claims, 10 Drawing Sheets

(56) References Cited

U.S. PATENT DOCUMENTS

| | | | |
|---|---|---|---|
| 4,879,919 A | | 11/1989 | Sekizaki |
| 5,086,896 A | | 2/1992 | Murakami et al. |
| 5,445,253 A | * | 8/1995 | Reyes .............................. 74/339 |
| 5,515,742 A | * | 5/1996 | Ibushuki ....................... 74/411.5 |

FOREIGN PATENT DOCUMENTS

| | | |
|---|---|---|
| FR | 2 924 777 A1 | 6/2009 |
| JP | 59-89832 | 5/1984 |
| JP | 59-189947 | 12/1984 |
| JP | 1-96018 | 6/1989 |
| JP | 08-028702 A1 | 2/1996 |
| JP | 11-210877 A1 | 8/1999 |
| JP | 11-344116 | 12/1999 |
| JP | 2011-190820 A1 | 9/2001 |
| JP | 2010-216603 | 9/2010 |
| JP | 2010-266044 | 11/2010 |
| JP | 2011-190820 A | 9/2011 |

OTHER PUBLICATIONS

Extended European Search Report (Application No. 12782761.6) dated Nov. 18, 2014.
Chinese Office Action (With Partial English Translation), Chinese Application No. 201280022735.3, dated Feb. 25, 2015 (11 pages).

* cited by examiner

REVERSE SHIFT DEVICE IN TRANSMISSION

BACKGROUND OF THE INVENTION

1. Field of the Invention

The present invention relates to improvement of a reverse shift device in a transmission for an automobile or the like, the reverse shift device having a reverse gear train composed of a driving gear, a driven gear, and an idle gear which moves in the axial direction and is thereby engaged with or disengaged from the two gears.

2. Description of Related Art

Such a type of reverse shift device in a transmission is disclosed as a conventional technique in Japanese Patent Application No. 2010-054942 (paragraphs [0002] to [0011]; FIGS. 1 and 7 to 9) filed by the applicant of the present invention. As shown in FIGS. 7 to 10, a transmission casing 10 of the transmission includes first and second casings 11 and 13 and a shift bracket 12 liquid-tightly intervening therebetween, and the three members 11 to 13 are united together with bolts, whereby the interior of the transmission casing 10 is divided into a first chamber S1 on a side toward the first casing 11 and a second chamber S2 on a side toward the second casing 13. In this transmission, a counter shaft 16 and an output shaft 17 are disposed in parallel with each other and are supported by the transmission casing 10 via bearings in such a manner as to be rotatable within the transmission casing 10; an input shaft 15 is rotatably driven by an engine via a clutch and is coaxially and rotatably coupled with one end of the output shaft 17 via a needle bearing; and the other end of the output shaft 17 is connected to driving wheels. Rotation of the input shaft 15 is transmitted at all times to the counter shaft 16 via a transmission gear pair 18, and there are provided, between the counter shaft 16 and the output shaft 17, a plurality of speed change gear pairs 20 to 23 within the first chamber S1 for selective power transmission and a reverse gear train 24 within the second chamber S2.

As shown mainly in FIG. 7, driving gears of the 1st-gear and 2nd-gear pairs 20 and 21 are fixed to the counter shaft 16, and the respective driven gears are rotatably supported on the output shaft 17. A first changeover clutch mechanism 25 provided between the two driven gears is a well-known synchronous engaging mechanism and has a clutch hub 25a which rotates with the output shaft 17, and a sleeve 25b which is spline-engaged with the clutch hub 25a at its outer circumference in an axially slidable manner. In a state in which the sleeve 25b is at the illustrated neutral position, the driven gears on the opposite sides of the sleeve 25b are not connected to the output shaft 17 and are thus freely rotatable; when a first shift fork 40, which partially constitutes a shift mechanism 29 (see FIG. 10) to be described later, moves the sleeve 25b to a side toward the 1st-gear pair 20, the driven gear of the 1st-gear pair 20 is connected to the output shaft 17, and power transmission is performed through the 1st-gear pair 20; and when the sleeve 25b is moved to a side toward the 2nd-gear pair 21, power transmission is performed through the 2nd-gear pair 21. The driving gear of the 3rd-gear pair 22 is fixed to the counter shaft 16, and the driven gear of the 3rd-gear pair 22 is rotatably supported on the output shaft 17 at its end portion toward the input shaft 15. A second changeover clutch mechanism 26 is a synchronous engaging mechanism similar to that of the first changeover clutch mechanism 25 and is provided between the driven gear of the 3rd-gear pair 22 and the driving gear of the transmission gear pair 18; when a second shift fork 41 moves a sleeve 26b to a side toward the 3rd-gear pair 22, the driven gear of the 3rd-gear pair 22 is connected to the output shaft 17, and power transmission is performed through the 3rd-gear pair 22; and when the sleeve 26b is moved to a side toward the transmission gear pair 18, the driving gear of the transmission gear pair 18 is connected to the output shaft 17, and the input shaft 15 and the output shaft 17 are thereby connected directly, whereby power transmission is performed in 4th gear.

A driving gear 23a of the 5th-gear pair 23 is rotatably supported on the counter shaft 16; a driven gear 23b of the 5th-gear pair 23 is fixed to the output shaft 17; and a third changeover clutch mechanism 27 which engages the driving gear 23a to and disengages the driving gear 23a from the counter shaft 16 is a so-called lever-type synchronous engaging mechanism and includes the following members: a clutch hub 27a which is formed coaxially and integrally with the driving gear 23a and has external splines 27a1 formed at its outer circumference and two cutouts 27a2 formed at circumferential positions; a sleeve 27b having internal splines 27b2 which are formed at its inner circumference and are engaged with the external splines 27a1 in an axially slidable manner; a rotating member 27c fixed to a distal end of the counter shaft 16 and having external splines 27c1 which are formed at its outer circumference and are engaged with the internal splines 27b2 in an axially slidable manner; a synchronizer ring 27d which is provided between the rotating member 27c and the clutch hub 27a and forms a cone friction clutch in cooperation with the rotating member 27c; and two semicircular lever members 27e which press the synchronizer ring 27d against the rotating member 27c at an initial stage of movement of the sleeve 27b in either axial direction and thereby synchronize the driving gear 23a and the rotating member 27c (whereby the counter shaft 16 and the output shaft 17 are synchronized at a predetermined change gear ratio between the driving and driven gears 23a and 23b). The sleeve 27b has cutout grooves 27b3 having a trapezoidal cross section and formed along its inner circumference at the axial centers of the internal splines 27b2. When the sleeve 27b is at the neutral position which is shown in FIG. 7 at an upper half of the third changeover clutch mechanism 27, the ends of central portions of the lever members 27e urged outwardly by springs (not shown) are elastically pressed against the bottom surfaces of the cutout grooves 27b3.

When a third shift fork 42, which partially constitutes the shift mechanism 29 to be described later, moves the sleeve 27b of the third changeover clutch mechanism 27 to a side toward the rotating member 27c (rightward in FIG. 7), first, the internal splines 27b2 of the sleeve 27b are engaged with external splines 27d1 of the synchronizer ring 27d; next, the distal end portions of the lever members 27e hit against a base portion of an inclined left side surface of the cutout groove 27b3 and move rightward, and, thus, the lever members 27e pivot on one side 27e 1 of their proximal end portions in contact with the end surface of the clutch hub 27a (see FIG. 8); accordingly, the distal end portions come into contact with the synchronizer ring 27d and press the synchronizer ring 27d rightward. Thus, the clutch hub 27a and the rotating member 27c are synchronized in rotation; subsequently, the clutch hub 27a moves to a 5th-gear shift position which is shown at a lower half of the third changeover clutch mechanism 27 (see FIG. 7); and the internal splines 27b2 are engaged with the external splines 27c1 of the rotating member 27c, and the driving gear 23a of the 5th-gear pair 23 is connected to the counter shaft 16, whereby power transmission is performed through the 5th-gear pair 23. In this condition, the lever members 27e are moved inward against the aforementioned springs (not shown) and onto crests of the internal splines 27b2 of the sleeve 27b.

As shown mainly in FIGS. 7 and 9, the reverse gear train 24 is composed of a driving gear 24a formed integral with the counter shaft 16; a driven gear 24c which is formed integral with the sleeve 25b of the first changeover clutch mechanism 25 at the outer circumference of the sleeve 25b and rotates at all times with the output shaft 17; and an idle gear 24b supported rotatably and axially movably by a support shaft 24d which is provided on the transmission casing 10 in parallel with the counter shaft 16 and with the output shaft 17. The idle gear 24b has an annular groove 24b1 formed coaxially at its outer circumference. A reverse arm 43 is disposed within a lower region of the transmission casing 10 and extends in a direction substantially orthogonal to the support shaft 24d; a proximal end portion of the reverse arm 43 is pivotally supported to the transmission casing 10 through a pivot pin 44 (see FIG. 9) orthogonal to the longitudinal direction of the reverse arm 43; and a pin 43a formed at a distal end portion of the reverse arm 43 is engaged with the annular groove 24b 1 of the idle gear 24b. When a reverse fork 34, which partially constitutes the shift mechanism 29 to be described next, pivots the reverse arm 43 about the pivot pin 44, the idle gear 24b is moved in the axial direction along the support shaft 24d between a disengagement position and an engagement position; the idle gear 24b at the disengagement position is represented by the solid line and is disengaged from both of the driving gear 24a and the driven gear 24c; and the idle gear 24b at the engagement position is represented by the dash-dot-dot line and is engaged with the driving gear 24a and with the driven gear 24c, whereby power transmission is performed through the reverse gear train 24.

Next, the shift mechanism 29 will be described with reference to FIG. 10. Three fork shafts 30 to 32 of the shift mechanism 29 have shift pieces 30a to 32a provided unitarily at their respective one ends and have stop rings 30c to 32c latched respectively thereto at positions located at the same distance from the end surfaces of the shift pieces 30a to 32a. Distal end portions of the fork shafts 30 to 32 are axially slidably fitted into support holes 11a to 11c, respectively, formed in the first casing 11 of the transmission casing 10 at the same pitch on the same plane, whereas portions of the first through third fork shafts 30 to 32, respectively, between the shift pieces 30a to 32a and the stop rings 30c to 32c are axially slidably fitted into holding holes 12a to 12c, respectively, formed in the shift bracket 12 of the transmission casing 10 at the same pitch on the same plane. Thus, the fork shafts 30 to 32 disposed in parallel with each other can move in the axial direction between a position where the end surfaces of the shift pieces 30a to 32a come into contact with one side surface of the shift bracket 12 and a position where the stop rings 30c to 32c come into contact with the other side surface of the shift bracket 12. Also, a holding hole 12d for holding a fixed shaft 33 is formed in the shift bracket 12 in parallel with and adjacent to the holding hole 12c on the same plane as that where the holding holes 12a to 12c are formed.

The shift bracket 12 has a guide hole 12e formed therein in such a manner as to orthogonally intersect the holding holes 12a to 12c, pass through their centers, and reach the holding hole 12d. Three notches 30d are formed at certain axial intervals in an upper circumferential portion of the first fork shaft 30 between the stop ring 30c and the end surface of the first shaft piece 30a. A detent device is formed by means of the notches 30d, a ball 36 provided in the guide hole 12e, and a spring 36a which is provided within the guide hole 12e between the ball 36 and a plug 36b for closing the inlet of the guide hole 12e and which presses the ball 36 toward the notches 30d. The detent device elastically locks the first fork shaft 30 at a neutral position and at two shift positions located on axially opposite sides, respectively, of the neutral position. Although unillustrated, a similar detent device is provided for each of the second and third fork shafts 31 and 32. An interlock mechanism for preventing simultaneous shift of the fork shafts 30 to 32 is formed by means of: two interlock pins 38 provided axially slidably in a portion of the guide hole 12e between the holding hole 12a and the holding hole 12c; a plurality of recesses (reference numeral 30e denotes one of the recesses) formed in outer circumferential surfaces of the first through third fork shafts 30 to 32; and an interlocking pin 38a provided in a hole which extends through the second fork shaft 31 at the position of the recess. The first and second shift forks 40 and 41 for moving the sleeves 25b and 26b of the first and second changeover clutch mechanisms 25 and 26 as mentioned above are fixed to intermediate portions of the first and second fork shafts 30 and 31. The third shift fork 42 for moving the sleeve 27b of the third changeover clutch mechanism 27 as mentioned above is formed at an end of the third shift piece 32a of the third fork shaft 32.

As shown in FIGS. 9 and 10, the reverse fork 34 for operating the reverse arm 43 is assembled into the shift mechanism 29 as follows: the third fork shaft 32 and the fixed shaft 33 are slidably inserted into a pair of the guide holes 34d and 34e, respectively, formed in parallel with each other. The reverse fork 34 can move between the illustrated neutral position and a reverse shift position; in a state in which the third fork shaft 32 is at the illustrated neutral position, the reverse fork 34 is at the neutral position such that one end surface of the reverse fork 34 is in contact with the stop ring 32c latched to the third fork shaft 32; and the reverse fork 34 is at the reverse shift position such that the other end surface of the reverse fork 34 is in contact with a stop ring 33a latched to the fixed shaft 33. A driving pin 34c projects from a head 34h provided at the distal end of an arm 34b (see FIG. 9) extending downward from the reverse fork 34; the driving pin 34c is slidably inserted between two flat inner side surfaces of an elongated hole 43b formed in a longitudinally intermediate portion of the reverse arm 43 with substantially no gap between the driving pin 34c and the inner side surfaces; and a stop ring 34g and a washer are used to prevent detachment of the driving pin 34c from the elongated hole 43b. Thus, the reverse arm 43 pivots about the pivot pin 44 in interlocking relation with movement of the reverse fork 34, whereby the idle gear 24b moves between the disengagement position and the engagement position.

As shown in FIG. 10, the reverse fork 34 has a closed-bottomed guide hole 34f formed therein and extending radially from the guide hole 34e, and the fixed shaft 33 has two notches 33b formed on its outer circumferential surface. A detent device is formed by means of the two notches 33b, a ball 37 provided within the guide hole 34f, and a spring 37a for pressing the ball 37 toward the notches 33b. The detent device elastically locks the reverse fork 34 at the neutral position and at the reverse shift position. Furthermore, the guide holes 34d and 34e of the reverse fork 34 communicate with each other through a hole 34a whose diameter is greater than the minimum wall thickness between the guide holes 34d and 34e; recesses 32d and 33c are formed on the outer circumferential surfaces of the third fork shaft 32 and the fixed shaft 33, respectively, at the respective positions corresponding to the hole 34a; and the hole 34a accommodates therein a ball 35 which alternately engages with the recess 32d and the recess 33c. Through employment of such a configuration, when the third fork shaft 32 is moved leftward from the illustrated neutral position, the reverse fork 34 is pressed by the stop ring 32c and thereby moves with the third fork shaft 32; when the third fork shaft 32 reaches the reverse shift position, the idle gear 24b is moved to the engagement position through the driving pin 34c and the reverse arm 43, whereby power transmission is performed through the reverse gear train 24; and when the third fork shaft 32 is returned to the neutral position, the reverse fork 34 also returns to its initial position. However, when the third fork shaft 32 is moved rightward from the illustrated neutral position, the detent device holds the reverse fork 34 at its position, and, since the ball 35 is engaged with the recess 33c, the reverse fork 34 remains at a halt; i.e., the reverse fork 34 is not moved.

In a state in which the fork shafts 30 to 32 of the shift mechanism 29 are at their neutral positions, radial end portions of the shift pieces 30a to 32a provided on the fork shafts 30 to 32, and squarish-letter-C-shaped cutouts (in FIG. 10, only a cutout 30b of the first shift piece 30a is shown, and other cutouts are behind other members) in the radial end portions are aligned in a direction orthogonal to the fork shafts 30 to 32. In this state, a selecting operation on an automatic or manual gear shifter (not shown) pivotally moves a shift and select shaft (not shown), and a distal end portion of an operating arm (not shown) provided at an end of the shift and select shaft is thereby selectively engaged with the cutout of any one of the shift pieces 30a to 32a; then, a shift operation on the gear shifter moves the shift and select shaft axially rightward or leftward, whereby the fork shaft 30, 31, or 32 selected by the operating arm moves rightward or leftward.

When the third fork shaft 32 is selected by the operating arm of the shift and select shaft and is shifted rightward (toward a 5th-gear side) in FIGS. 7 and 10, as mentioned above, first, the synchronizer ring 27d is engaged with the rotating member 27c, whereby the clutch hub 27a and the rotating member 27c are synchronized in rotation; next, the internal splines 27b2 of the sleeve 27b are engaged with the external splines 27c1 of the rotating member 27c, whereby the driving gear 23a of the 5th-gear pair 23 is connected to the counter shaft 16 (see the lower half of the third changeover clutch mechanism 27 in FIG. 7), and power transmission is performed through the 5th-gear pair 23. Even when the third fork shaft 32 is shifted rightward in this manner, as mentioned above, the reverse fork 34 remains at a halt at the neutral position (see FIG. 10).

Similarly, when the third fork shaft 32 is selected and is shifted leftward (toward a reverse side) in FIGS. 7 and 10, as mentioned above, first, the synchronizer ring 27d is engaged with the rotating member 27c, whereby the counter shaft 16 and the output shaft 17 are synchronized at a predetermined change gear ratio; however, since, in shift to reverse, the output shaft 17 connected to the driving wheels is substantially at a halt, the counter shaft 16 is also substantially at a halt. The reverse fork 34 is pressed by the stop ring 32c and moves with the third fork shaft 32; the reverse arm 43 with the driving pin 34c of the reverse fork 34 inserted without any gaps between opposed inner side surfaces of its elongated hole 43b pivots about the pivot pin 44 provided at its proximal end and thereby moves the idle gear 24b through a pin 43a provided at its distal end; and when the third fork shaft 32 and the reverse fork 34 reach the reverse shift position, the reverse arm 43 and the idle gear 24b reach the engagement position, whereby the idle gear 24b is engaged with the driving gear 24a and with the driven gear 24c.

Although the driving gear 24a and the driven gear 24c are synchronized as mentioned above, since the driving gear 24a and the driven gear 24c are provided on the counter shaft 16 and the output shaft 17, respectively, which are substantially at a halt, the above-mentioned engagement does not raise gear rattle. Also, since the reverse fork 34, the reverse arm 43, and the idle gear 24b are shifted in association with the leftward (toward the reverse side) shift of the third fork shaft 32 from the neutral position, but are not shifted in association with the rightward (toward the 5th-gear side) shift, the amounts of movements of these members 34, 43, and 24b reduce accordingly, whereby these members can avoid interfering with peripheral members, such as the shift bracket 12.

SUMMARY OF THE INVENTION

Problem to be Solved by the Invention

In such a type of reverse shift device in a transmission, in order to ensure strength of gears, a certain engaging length of gears must be ensured. It is relatively easy to ensure a certain engaging length for driving gears and driven gears, which do not move in the axial direction. However, the idle gear is limited such that the overall tooth length including the engaging length cannot be greater than the amount of movement in the longitudinal direction. Meanwhile, since the reverse fork, the reverse arm, and the idle gear encounter difficulty in increasing the amounts of their movements in order to avoid interfering with peripheral members, the idle gear encounters difficulty in increasing its overall tooth length for ensuring gear strength. An object of the present invention is to solve such a problem by means of increasing the amount of movement of the reverse arm without increasing the amount of movement of the reverse fork.

Also, in such a type of reverse shift device in a transmission, in order to prevent the occurrence of gear rattle, the movable idle gear 24b must be engaged with the driving gear 24a and with the driven gear 24c after completion of synchronization between the counter shaft 16 and the output shaft 17. In order to meet the requirement, at the time of start of reverse shift, the distance between a chamfer 24b1 provided at an end of the movable idle gear 24b and chamfers 24a1 and 24c1 provided at ends of the driving gear 24a and the driven gear 24c (particularly, the chamfer provided at an end of a gear to be engaged later) must be greater than a shift stroke required for synchronization; therefore, the overall tooth length of the idle gear 24b must be the amount of longitudinal movement of the idle gear 24b minus the distance. An object of the present invention is also to solve such a problem.

Means for Solving the Problem

To achieve the above object, the present invention provides a reverse shift device in a transmission, comprising a counter shaft and an output shaft supported rotatably and in parallel with each other within a transmission casing, a plurality of speed change gear pairs and a reverse gear train for performing power transmission between the counter shaft and the output shaft, and a shift mechanism for performing selective changeover of power transmission between the counter shaft and the output shaft through the speed change gear pairs and the reverse gear train, the reverse gear train comprising a driving gear and a driven gear provided on and rotating with the counter shaft and the output shaft, respectively, and an idle gear supported in such a manner as to be rotatable and movable in an axial direction by a support shaft provided on the transmission casing in parallel with the counter shaft and the output shaft, the shift mechanism comprising a reverse arm whose proximal end portion is supported on the transmission casing in such a manner as to be pivotable about an axis orthogonal to the support shaft, whose distal end portion is slidably inserted into an annular groove formed in an outer circumference of the idle gear, and which has a driven hole formed in an intermediate portion thereof, elongated in a direction connecting the proximal end portion and the distal end portion, and extending through the intermediate portion in a direction parallel to the axis orthogonal to the support shaft, and a reverse fork supported on the transmission casing in such a manner as to be movable in parallel with the support shaft and having a driving pin engaged with the driven hole, and the idle gear being moved in an axial direction of the support shaft between an engagement position where the idle gear is engaged with the driving and driven gears, and a disengagement position where the idle gear is disengaged from the driving and driven gears, by means of moving the reverse fork in the axial direction and thereby pivoting the reverse arm, the reverse shift device having a jump-over mechanism is provided between the reverse arm and the transmission casing and elastically urges the reverse arm outward away from a predetermined intermediate position within a pivoting range of the reverse arm, an outside diameter of the driving pin of the reverse fork is smaller than a width between opposed flat inner side surfaces of a longitudinally intermediate portion of the driven hole of the reverse arm so as to form a gap between the driving pin and the inner side surfaces of the driven hole, and, when the reverse arm is situated on one side of the predetermined intermediate position such that the distal end portion thereof is engaged with the idle gear situated at the disengagement position, the driving pin is elastically in contact with one of the opposed flat inner side surfaces of the longitudinally intermediate portion of the driven hole, and, when the reverse arm is situated on the other side of the predetermined intermediate position such that the distal end portion thereof is engaged with the idle gear situated at the engagement position, the driving pin is elastically in contact with the other one of the opposed flat inner side surfaces of the longitudinally intermediate portion of the driven hole.

Preferably, in the reverse shift device in a transmission described in the above paragraph, the reverse fork is connected to one fork shaft which operates one changeover clutch mechanism for performing selective changeover of power transmission between the counter shaft and the output shaft through any one of the speed change gear pairs, in such a manner as to be not moved when the one fork shaft is shifted, from its neutral position, in a direction to operate the one changeover clutch mechanism, and in such a manner as to be moved together with the one fork shaft when the one fork shaft is shifted, from its neutral position, in an opposite direction toward a reverse shift position, and the one changeover clutch mechanism comprises a synchronizing mechanism for synchronizing the counter shaft and the output shaft at a predetermined change gear ratio at an early stage of shift stroke, irrespective of the direction of shift by the one fork shaft.

Preferably, the reverse shift device in a transmission described in the above paragraph further comprises a reverse bracket fixed to the transmission casing and having a first stopper portion and a second stopper portion disposed opposite to each other and a connection portion integrally connecting the first and second stopper portions; and, in the reverse shift device, a proximal end portion of the reverse arm is pivotally supported by a support pin provided on the connection portion, and the reverse arm elastically urged by the jump-over mechanism is positioned and stopped at the disengagement position of the idle gear through contact of a protrusion provided on a portion of the reverse arm with the first stopper portion, and is positioned and stopped at the engagement position of the idle gear through contact of one side surface of the driven hole with the driving pin of the reverse fork stopped through contact with the second stopper portion.

Preferably, in the reverse shift device in a transmission described in the above paragraph, positioning and stopping of the reverse arm through contact of the protrusion with the first stopper portion is performed before the one fork shaft returns to its neutral position, and, upon return of the one fork shaft to the neutral position, the driving pin moves away from one flat inner side surface of the driven hole.

Preferably, in the reverse shift device in a transmission described in the above two paragraphs, the jump-over mechanism comprises a hook hole formed in the reverse arm in parallel with the support pin at a position located away from the support pin, a hook hole formed in parallel with the hook hole of the reverse arm in a portion of the reverse bracket which, when the reverse arm is at the predetermined intermediate position within its pivoting range, is on a plane which contains the centerlines of the support pin and the hook hole of the reverse arm, and a torsion coil spring whose opposite ends are extended outward and bent to be hooked into the respective hook holes.

Effects of the Invention

According to the present invention, the jump-over mechanism is provided between the reverse arm and the transmission casing and elastically urges the reverse arm outward away from a predetermined intermediate position within the pivoting range of the reverse arm; the outside diameter of the driving pin of the reverse fork is smaller than the width between opposed flat inner side surfaces of a longitudinally intermediate portion of the driven hole of the reverse arm so as to form a gap between the driving pin and the inner side surfaces of the driven hole; and when the reverse arm is situated on a side of the predetermined intermediate position such that the distal end portion thereof is engaged with the idle gear situated at the disengagement position, the driving pin is elastically in contact with one of the opposed flat inner side surfaces of the longitudinally intermediate portion of the driven hole, and, when the reverse arm is situated on the other side of the predetermined intermediate position such that the distal end portion thereof is engaged with the idle gear situated at the engagement position, the driving pin is elastically in contact with the other one of the opposed flat inner side surfaces of the longitudinally intermediate portion of the driven hole. Thus, in reverse shift, the driving pin of the reverse fork, which moves from the neutral position, first comes into contact with and presses one inner side surface of the driven hole, whereby the reverse arm is pivoted against the urging force of the jump-over mechanism with movement of the reverse fork; when the reverse arm passes a predetermined intermediate position within the pivoting range, the direction of the urging force of the jump-over mechanism reverses, so that the reverse arm is instantaneously pivoted to a position where the other inner side surface of the driven hole comes into contact with the driving pin; subsequently, with the driving pin held in contact with the other inner side surface of the driven hole, the reverse arm is pivoted with movement of the reverse fork. In this manner, in the midst of pivoting, the reverse arm is instantaneously pivoted by an amount corresponding to the difference between the outside diameter of the driving pin and the width between the opposed inner side surfaces of the driven hole, and, in the other stage of pivoting, the reverse arm is moved together with the reverse fork; therefore, the pivoting angle of the reverse arm is greater by the angle of instantaneous pivoting than that in the aforementioned conventional technique in which the driving pin is inserted between the opposed inner side surfaces of the elongated hole formed in the reverse arm with substantially no gap between the driving pin and the inner side surfaces. Thus, in the case where the reverse forks have the same amount of movement, the reverse arm and the idle gear in the present invention are greater in the amount of movement than those in the aforementioned conventional technique; therefore, the overall tooth length including the engaging length of the idle gear can be increased accordingly, and the strength of the idle gear can thereby be ensured.

Some embodiments of the present invention are configured such that: the reverse fork is connected to one fork shaft which operates one changeover clutch mechanism for performing selective changeover of power transmission between the counter shaft and the output shaft through any one of the speed change gear pairs, in such a manner as to be not moved when the one fork shaft is shifted, from its neutral position, in a direction to operate the one changeover clutch mechanism, and in such a manner to be moved together with the one fork shaft when the one fork shaft is shifted, from its neutral position, in an opposite direction toward a reverse shift position, and the one changeover clutch mechanism comprises a synchronizing mechanism for synchronizing the counter shaft and the output shaft at a predetermined change gear ratio at an early stage of shift stroke, irrespective of the direction of shift by the one fork shaft. Thus, according to these embodiments, the reverse fork is operated through utilization of one fork shaft which operates the one changeover clutch mechanism for performing selective changeover of power transmission between the counter shaft and the output shaft through one speed change gear pair, thereby eliminating need to use a dedicated fork shaft and thus simplifying the structure. Also, since the reverse fork is not moved when the one fork shaft is shifted in a direction to operate the one changeover clutch mechanism, the reverse fork, the reverse arm, and the idle gear can be reduced in the amount of movement, thereby reducing the risk of interference of these members with peripheral members, such as the shift bracket.

Some embodiments of the present invention are configured to further comprise a reverse bracket fixed to the transmission casing and having a first stopper portion and a second stopper portion disposed opposite to each other and a connection portion integrally connecting the first and second stopper portions, and configured such that: a proximal end portion of the reverse arm is pivotally supported by a support pin provided on the connection portion, and the reverse arm elastically urged by the jump-over mechanism is positioned and stopped at the disengagement position of the idle gear through contact of a protrusion provided on a portion of the reverse arm with the first stopper portion, and is positioned and stopped at the engagement position of the idle gear through contact of one side surface of the driven hole with the driving pin of the reverse fork stopped through contact with the second stopper portion. Thus, according to these embodiments, since the first and second stopper portions restrict the pivoting range of the reverse arm elastically urged by the jump-over mechanism in a direction away from the predetermined intermediate position, the risk of interference of the reverse arm with peripheral members is reduced. Also, since the reverse bracket, the reverse arm, and the jump-over mechanism can be attached to the transmission casing in the form of a single subassembly, assembling is facilitated.

Another embodiment of the present invention is configured such that: positioning and stopping of the reverse arm through contact of the protrusion with the first stopper portion is performed before the one fork shaft returns to its neutral position, and, upon return of the one fork shaft to the neutral position, the driving pin moves away from one flat inner side surface of the driven hole. Thus, according to this embodiment, when a third fork shaft is moved from its neutral position toward a reverse side, the reverse arm is not pivoted until the driving pin of the reverse fork comes into contact with one inner side surface of the driven hole; therefore, the reverse gear train is also not moved. Therefore, the tooth-end-to-tooth-end distance at the neutral position along the gear moving direction between the idle gear and the driving gear or the driven gear can be reduced by an amount corresponding to a stroke of the reverse fork until establishment of the contact of the driving pin with the one inner side surface of the driven hole. Accordingly, the tooth length of the idle gear can be increased by an amount corresponding to the reduction of the distance, whereby the strength of the idle gear can be ensured.

In one embodiment, the present invention is configured such that: the jump-over mechanism comprises a hook hole formed in the reverse arm in parallel with the support pin at a position located away from the support pin, a hook hole formed in parallel with the hook hole of the reverse arm in a portion of the reverse bracket which, when the reverse arm is at the predetermined intermediate position within its pivoting range, is on a plane which contains the centerlines of the support pin and the hook hole of the reverse arm, and a torsion coil spring whose opposite ends are extended outward and bent to be hooked into the respective hook holes. Thus, according to this embodiment, since the jump-over mechanism is composed substantially of a single spring only, the structure of the jump-over mechanism is very simple.

DETAILED DESCRIPTION OF THE INVENTION

A reverse shift device in a transmission according to an embodiment of the present invention will next be described mainly with reference to FIGS. 1 to 6. The present embodiment has substantially the same structure as that of the aforementioned conventional technique except for a reverse fork 51 and a reverse arm 55, which partially constitute a shift mechanism 29 of the conventional technique, and their relevant members. Therefore, the following description omits repeated description of features similar to those of the aforementioned conventional technique and covers mainly the structures and actions of the reverse fork 51 and the reverse arm 55 as well as their relevant members.

Figure 7:
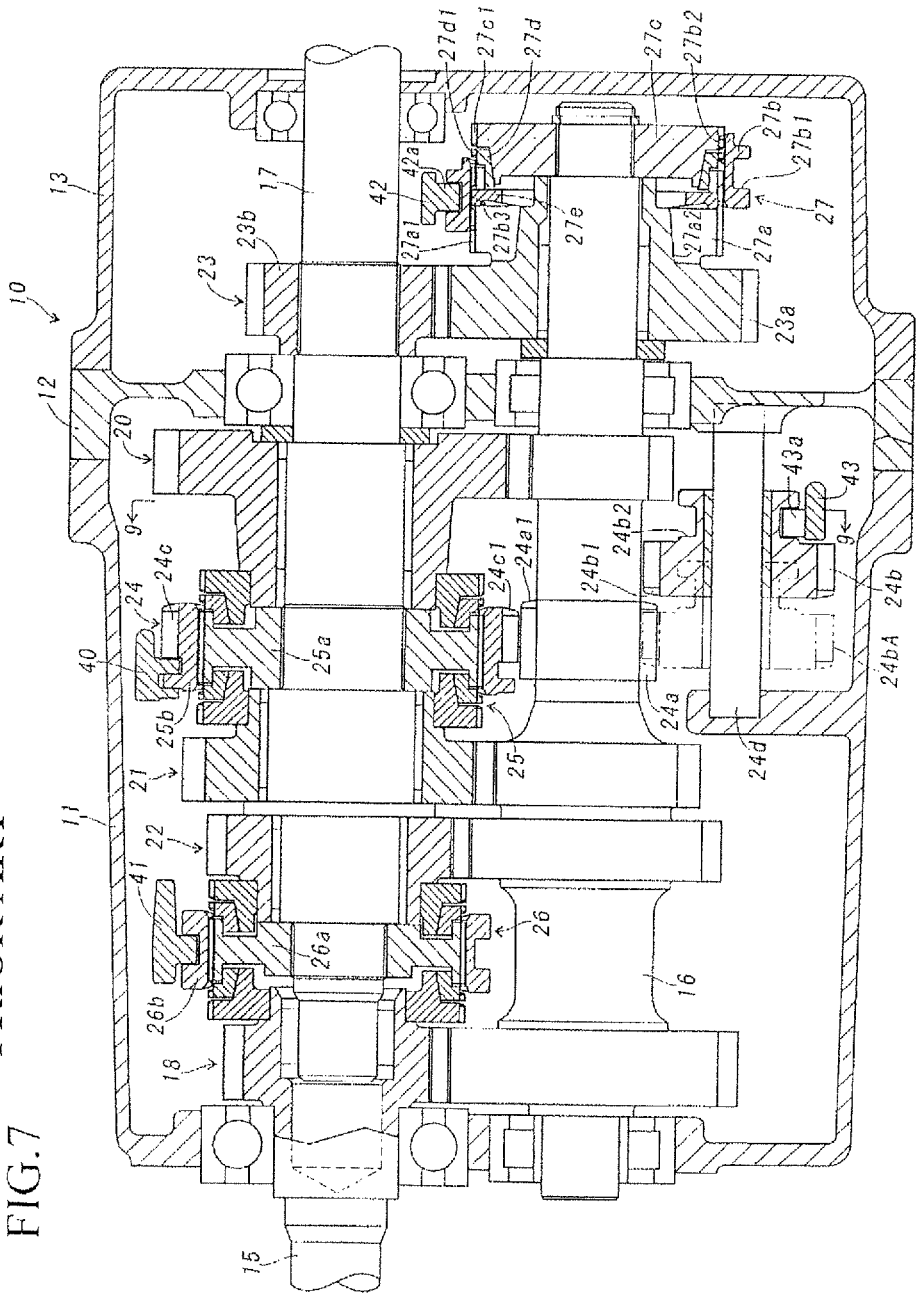
FIG. 7 Longitudinal sectional view showing the overall structure of one example of a conventional transmission having a conventional reverse shift device.
Figure 8:
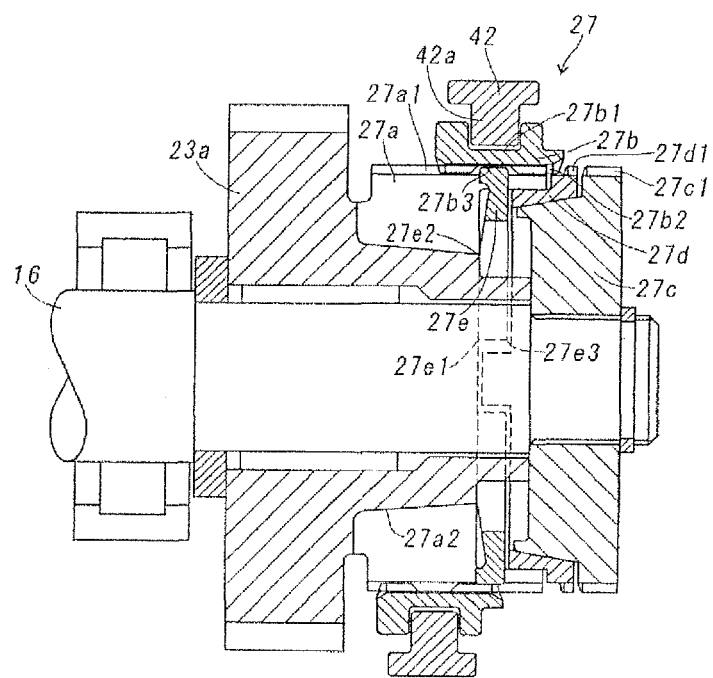
FIG. 8 Enlarged sectional view showing a conventional third changeover clutch mechanism of the conventional transmission of FIG. 7.
Figure 9:
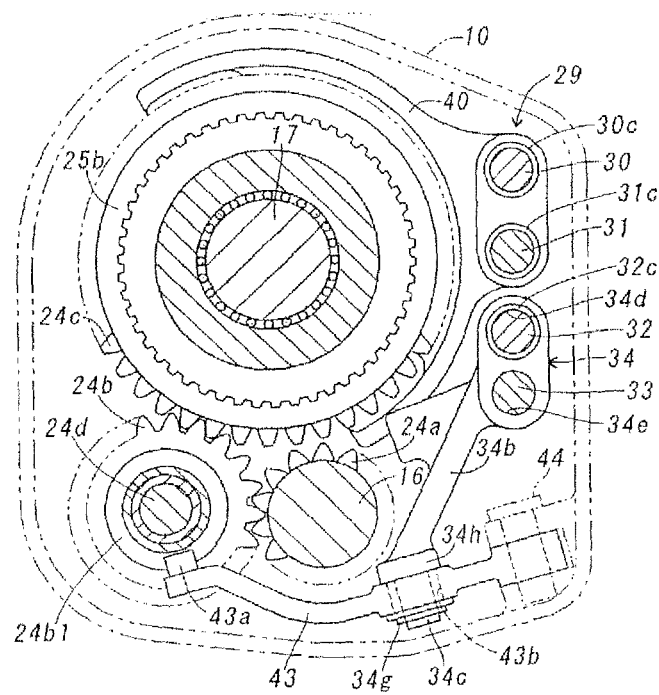
FIG. 9 Sectional view taken along line 9-9 of FIGS. 7 and 10.
Figure 10:
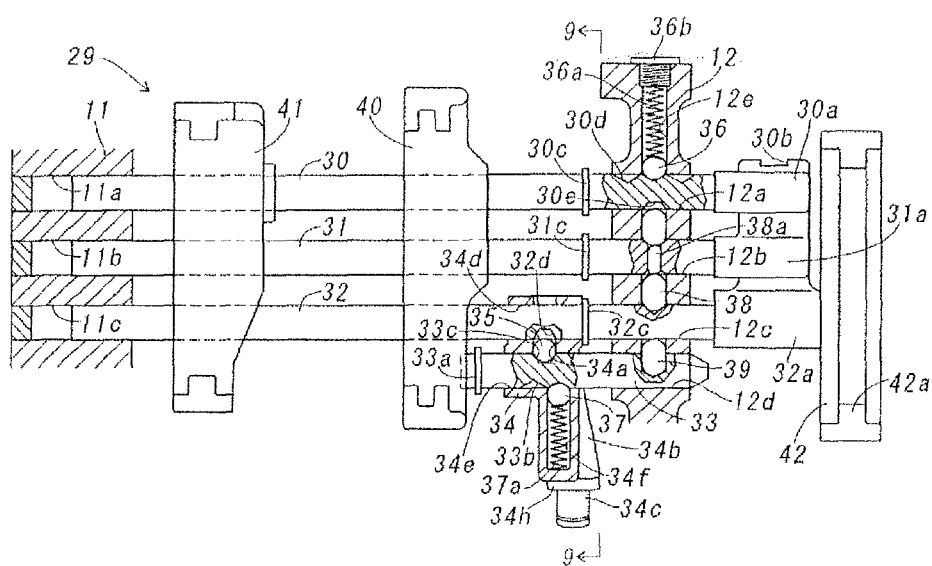
FIG. 10 Front view showing a conventional shift mechanism shown in FIG. 7.

First, the structure of a reverse gear train 50 is described with reference to FIGS. 1 and 3. The reverse gear train 50 includes a driving gear 50a formed integrally with a counter shaft 16; a driven gear 50c formed integrally at the outer circumference of a sleeve 25b of a first changeover clutch mechanism 25 and rotated at all times with an output shaft 17; and an idle gear 50b supported rotatably and axially movably by a support shaft 50d provided on a transmission casing 10 in parallel with the counter shaft 16 and the output shaft 17. The idle gear 50b is moved axially along the support shaft 50d between a disengagement position represented by the solid line and an engagement position represented by the dash-dot-dot line. The reverse gear train 50 has substantially the same structure as that of a reverse gear train 24 of the conventional technique having been described with reference to FIGS. 7 and 9. However, by virtue of the structures of the reverse fork 51, the reverse arm 55, and their relevant members, which will be described later, the tooth length of the idle gear 50b can be increased as compared with the aforementioned conventional technique, whereby the strength of the idle gear 50b can be ensured.

Next, the structures of the reverse arm 55 and its relevant members will be described with reference to FIGS. 1 and 2. The reverse arm 55 is attached to a shift bracket 12 of the transmission casing 10 through a reverse bracket 53, and a jump-over mechanism JO is provided between the reverse bracket 53 and the reverse arm 55. The reverse bracket 53 is formed by bending a blank of a thick metal plate into a shape resembling a sideways squarish letter U and includes a first stopper portion 53a and a second stopper portion 53b, which are disposed opposite to and in parallel with each other, and a connection portion 53c which integrally connects the first and second stopper portions 53a and 53b at their ends. The first stopper portion 53a has two threaded holes 53f formed therein for attaching the reverse bracket 53 to the shift bracket 12 of the transmission casing 10 with bolts 57 and also has a slender protruding portion 53d formed thereon at a side opposite the connection portion 53c and extending in parallel with the connection portion 53c for attaching the jump-over mechanism JO thereto. A support pin 54 stands from the connection portion 53c at a position between the first and second stopper portions 53a and 53b and is fixed through crimping. In a state in which the reverse bracket 53 is fixed to the shift bracket 12, the support pin 54 is orthogonal to the support shaft 50d of the idle gear 50b.

Figure 1:
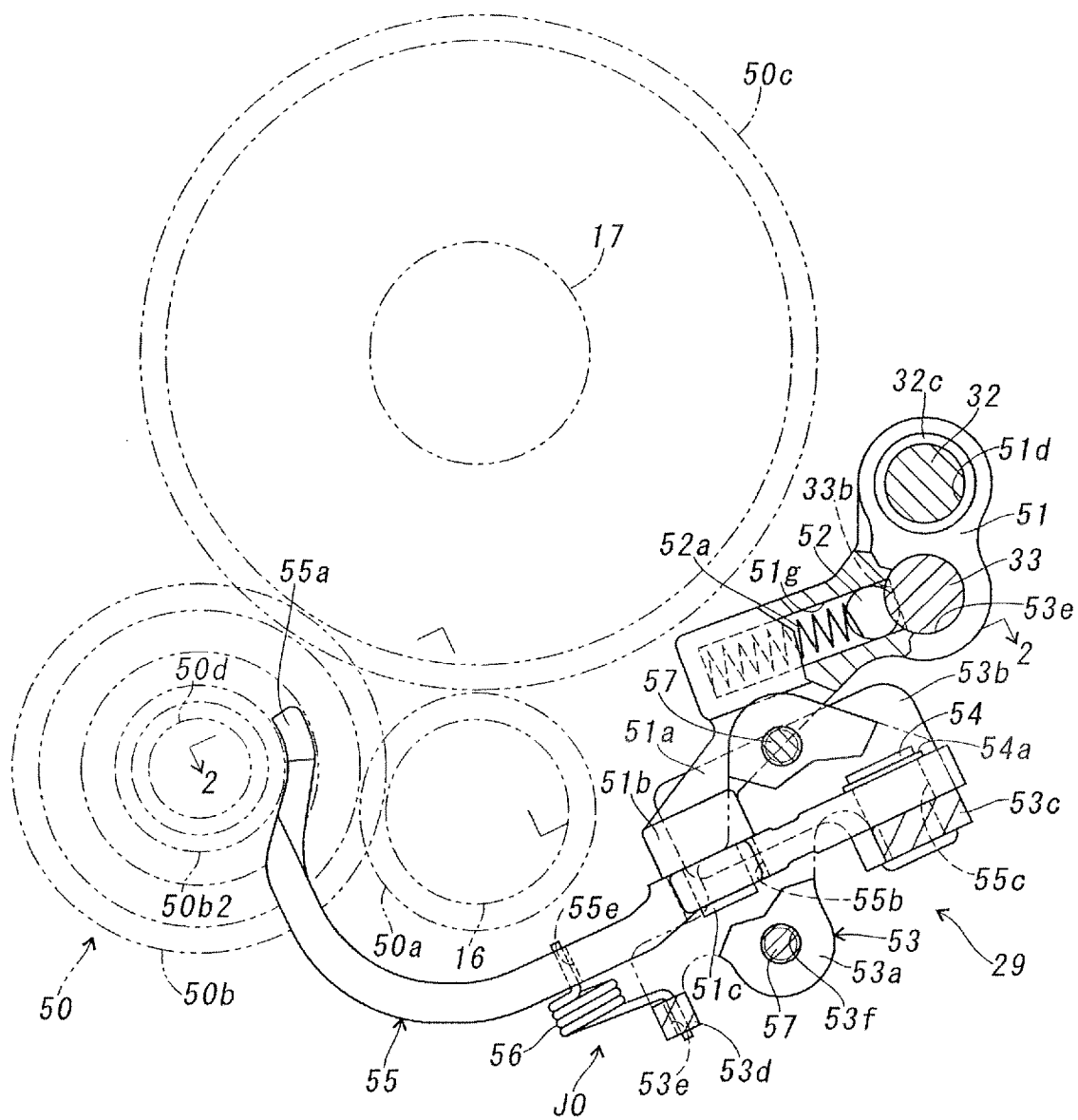
FIG. 1 Sectional view showing essential members of a reverse shift device in a transmission according to an embodiment of the present invention.
Figure 2:
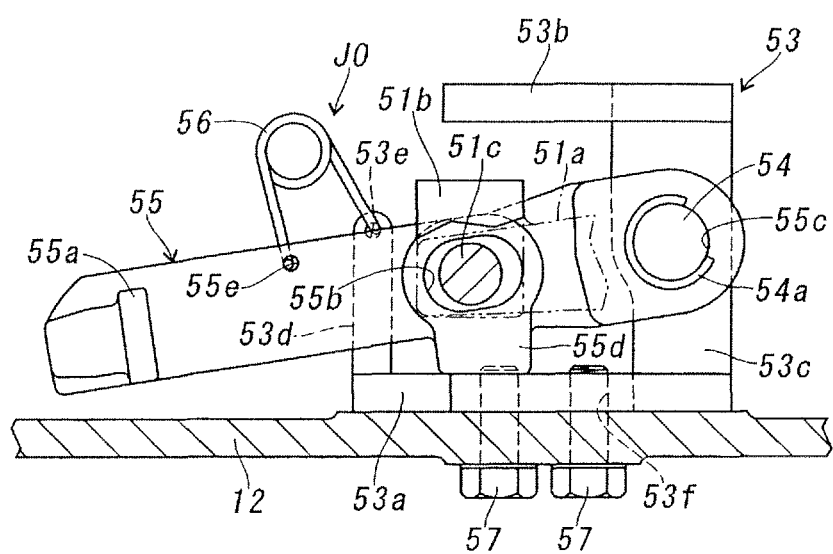
FIG. 2 Plan view taken along line 2-2 of the embodiment shown in FIG. 1.

As shown in FIGS. 1 and 2, a pivot hole 55c formed in a proximal end portion of the reverse arm 55 is pivotally fitted to the support pin 54 of the reverse bracket 53, and a stop ring 54a is used to prevent detachment of the pivot hole 55c; a distal-side portion of the reverse arm 55 is curved widely around the counter shaft 16; and a distal end 55a of the reverse arm 55 is slidably inserted into an annular groove 50b2 formed in the outer circumference of the idle gear 50b of the reverse gear train 50 with substantially no gap between the distal end 55a and side walls of the annular groove 50b2. The reverse arm 55 has a longitudinally elongated driven hole 55b which is formed in a longitudinally intermediate portion located, toward the proximal end portion, between the proximal end portion and the distal end portion 55a and which extends therethrough in parallel with the support pin 54. Pivoting of the reverse arm 55 pivotally supported by the support pin 54 in the counterclockwise direction in FIG. 2 is stopped through contact of a protrusion 55d formed under the driven hole 55b with the first stopper portion 53a.

Similar to a reverse fork 34 of the aforementioned conventional technique, the reverse fork 51 is movably supported on a third fork shaft 32 and a fixed shaft 33 in parallel with the support shaft 50d; an arm portion 51a extending from the reverse fork 51 toward lower left in FIG. 1 has a head portion 51b which is provided at its distal end and whose lower surface is in contact with the upper surface of a portion of the reverse arm 55 having the driven hole 55b formed therein; and a driving pin 51c protruding from the lower surface of the head portion 51b is inserted into the driven hole 55b. The driving pin 51c has an outside diameter smaller than the width between opposed flat inner side surfaces of a longitudinally intermediate portion of the driven hole 55b, so that a certain gap is formed between the driving pin 51c and the inner side surfaces. Similar to the aforementioned conventional technique, the reverse fork 51 is incorporated into a shift mechanism 29 in such a manner as to be not moved when the third fork shaft 32 is shifted, from its neutral position, in a direction to operate a third changeover clutch mechanism 27, and in such a manner as to be moved together with the third fork shaft 32 when the third fork shaft 32 is shifted, from its neutral position, in an opposite direction toward a reverse shift position.

Next, the jump-over mechanism JO which elastically urges the reverse arm 55 outward away from a predetermined intermediate position within the pivoting range of the reverse arm 55 will be described with reference to FIGS. 1 and 2. The slender protruding portion 53d, which, as mentioned above, is formed on the first stopper portion 53a at a side opposite the connection portion 53c and extends in parallel with the connection portion 53c, has a hook hole 53e formed in its distal end portion in parallel with the support pin 54. Also, the reverse arm 55 has a hook hole 55e formed therein in parallel with the support pin 54 at a position located more distant from the support pin 54 than the position of the hook hole 53e. The positional relationship among the centerlines of the support pin 54 and the hook holes 53e and 55e is determined in the following manner: when the reverse arm 55 is at the disengagement position shown in FIG. 2, the centerline of the distal end portion 55a is located under a plane which contains the centerlines of the support pin 54 and the hook hole 53e; when the reverse arm 55 is pivoted from the disengagement position toward the engagement position and reaches a predetermined intermediate position within the pivoting range (e.g., a position of about ⅓ of the pivoting range), the centerlines of the support pin 54 and the hook holes 53e and 55e are arrayed on one plane; and when the reverse arm 55 is pivoted further, the centerline of the distal end portion 55a is located above the plane which contains the centerlines of the support pin 54 and the hook hole 53e. A torsion coil spring 56 whose opposite ends are extended outward and bent is warped such that the opposite ends thereof approach each other; then, as illustrated, the bent ends are inserted into the hook holes 53e and 55e, respectively, thereby urging the hook holes 53e and 55e outward. The two hook holes 53e and 55e and the torsion coil spring 56, which is attached to the hook holes 53e and 55e as mentioned above, constitute the jump-over mechanism JO which urges the reverse arm 55 outward away from a predetermined intermediate position within the pivoting range of the reverse arm 55. In the present embodiment, the hook hole 55e is more distant from the center of the support pin 54 than is the hook hole 53e. However, on the contrary, the hook hole 53e may be more distant from the center of the support pin 54 than is the hook hole 55e.

In the present embodiment, the reverse fork 51 is movable between a neutral position where one end surface of the reverse fork 51 is in contact with a stop ring 32c latched to the third fork shaft 32 in a state in which the third fork shaft 32 is at its neutral position, and a reverse shift position where the other end surface of the reverse fork 51 is in contact with a stop ring 33a latched to the fixed shaft 33; meanwhile, the pivoting range of the reverse arm 55 rotatably supported by the support pin 54 is between a disengagement position where, as shown in FIG. 2, the reverse arm 55 is stopped through contact of the protrusion 55d formed under the driven hole 55b with the first stopper portion 53a, and an engagement position where, in a state in which the reverse arm 55 is stopped through contact of the end surface of the head portion 51b with the second stopper portion 53b, and the other inner side surface (the lower inner side surface in FIG. 2) of the driven hole 55b is in contact with the driving pin 51c. The interlocking relation between the reverse fork 51 and the reverse arm 55 is determined as follows: at the time when the reverse arm 55 reaches the disengagement position and is stopped through contact of the protrusion 55d with the first stopper portion 53a, the reverse fork 51 which moves together with the third fork shaft 32 does not reach the neutral position; subsequently, the reverse fork 51 moves further by a certain distance to reach the neutral position. Therefore, when the third fork shaft 32 and the reverse fork 51 are at the neutral position, as shown in FIG. 2, the driving pin 51c of the reverse fork 51 is away from one inner side surface (the upper inner side surface in FIG. 2) of the driven hole 55b.

Figure 4:
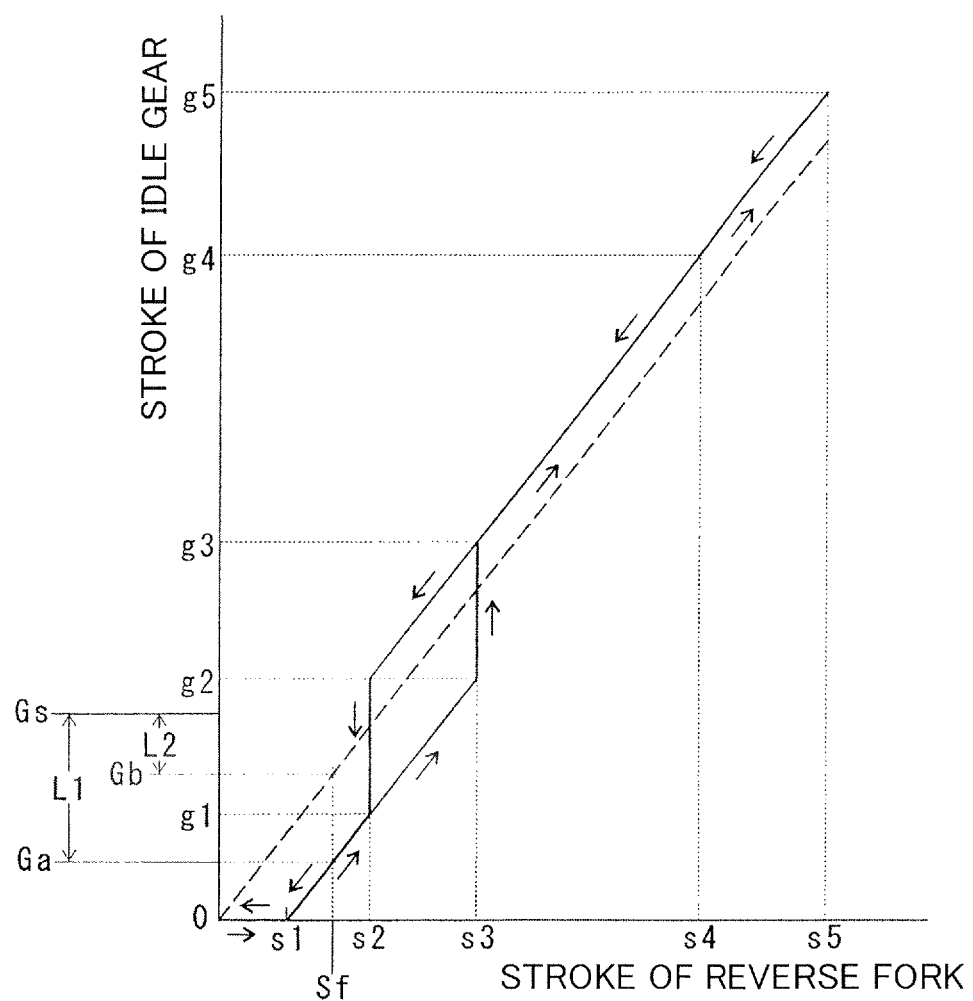
FIG. 4 Characteristic diagram showing the stroke of a reverse fork vs. the stroke of an idle gear in the embodiment shown in FIGS. 1 to 3.
Figure 5:
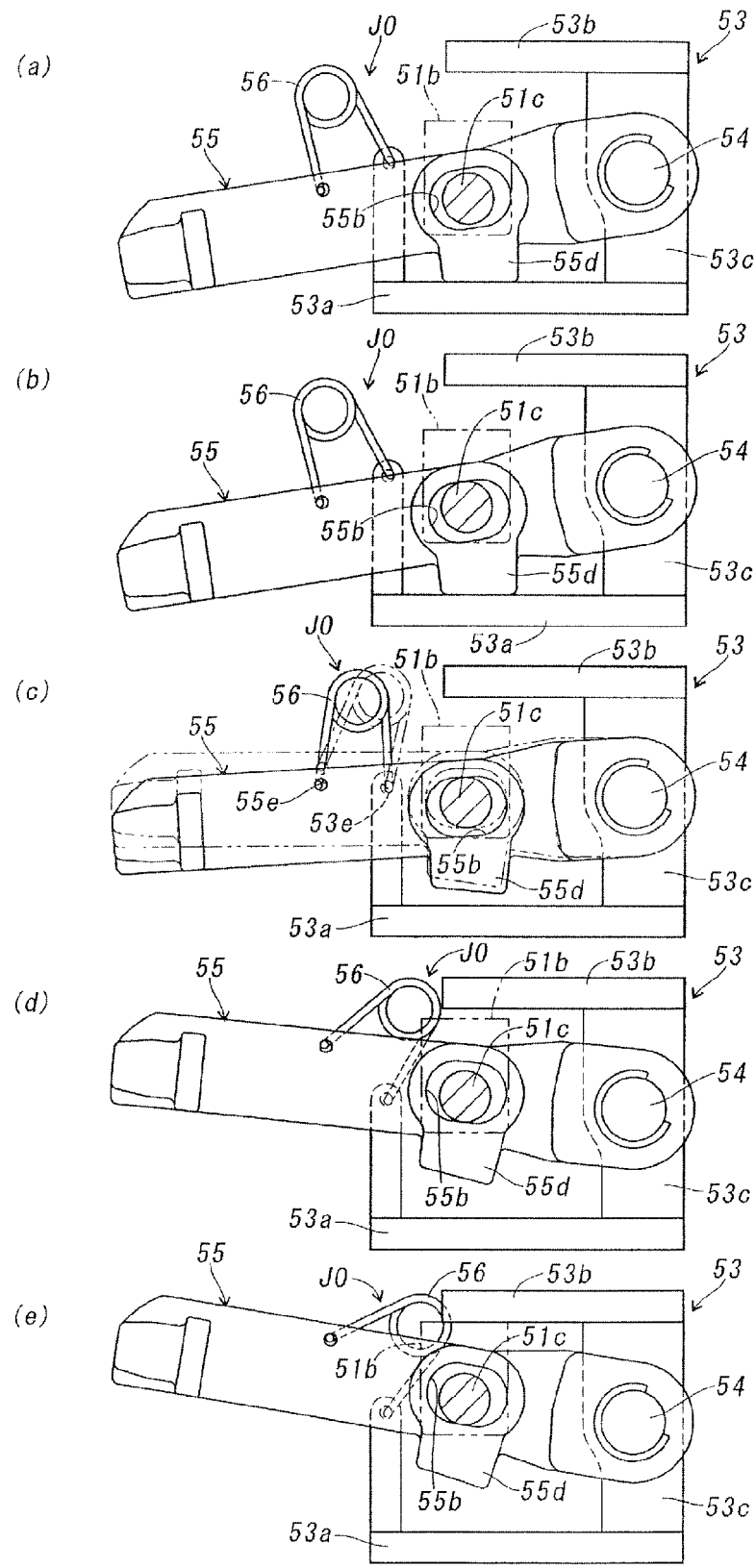
FIG. 5 A set of views showing operations of essential members at points of time in the process of reverse shift in the embodiment shown in FIGS. 1 to 3.
Figure 6:
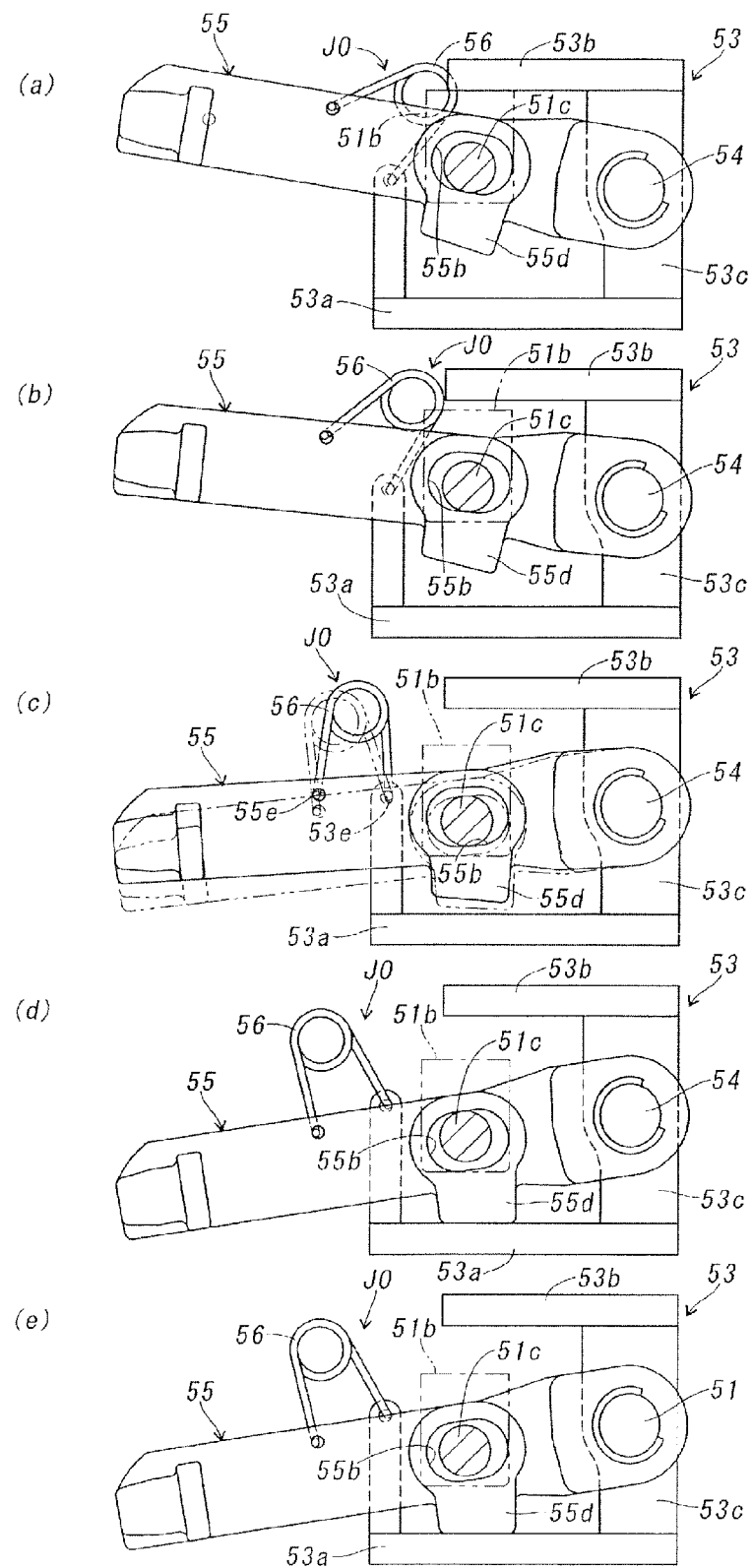
FIG. 6 A set of views showing operations of essential members at points of time in the process of reverse-to-neutral return shift in the embodiment shown in FIGS. 1 to 3.

Next, the operation of the present embodiment will be described with reference to FIGS. 4 to 6. In FIG. 4, the solid line represents the characteristic of the stroke of the reverse fork vs. the stroke of the idle gear of the reverse gear train in the embodiment which has been described with reference to FIGS. 1 to 3, whereas the broken line represents the characteristic of the stroke of the reverse fork vs. the stroke of the idle gear of the reverse gear train in the conventional technique which has been described with reference to FIGS. 7 to 10. FIGS. 5 and 6 show operations of essential members at points of time in the processes of reverse shift and reverse-to-neutral return shift, respectively, in the embodiment shown in FIGS. 1 to 3. First, there is described, with reference to FIGS. 4 and 5, operations in the process of reverse shift of the third fork shaft 32 moving from the neutral position to the reverse shift position.

Figure 3:
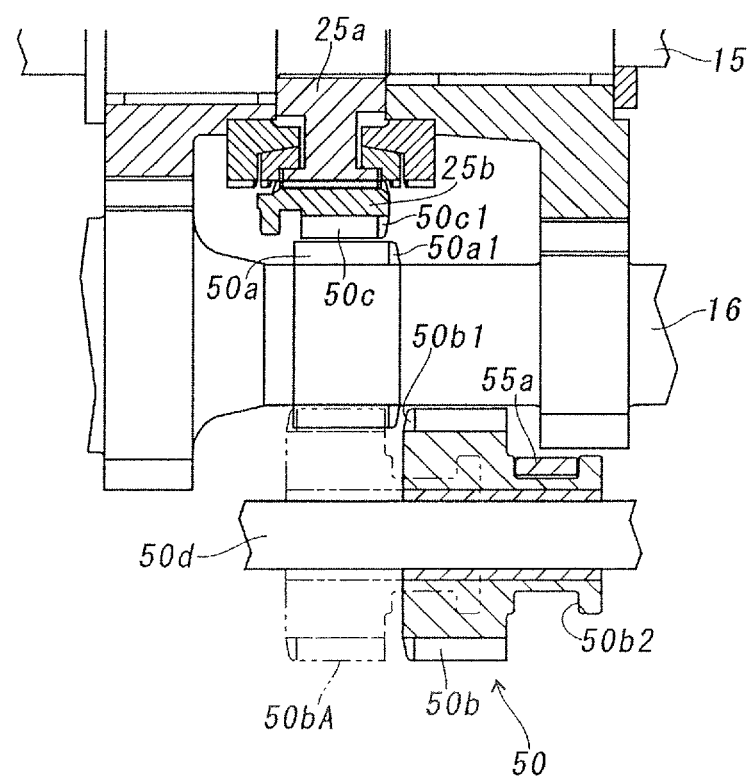
FIG. 3 Sectional view showing a reverse gear train of the embodiment shown in FIG. 1.

FIG. 5(a) shows a state in which the third fork shaft 32 is at the neutral position; in this state, the reverse arm 55 is at the disengagement position where the jump-over mechanism JO causes the protrusion 55d to be in contact with the first stopper portion 53a; therefore, the idle gear 50b is at the disengagement position represented by the solid line in FIG. 3. At the neutral position, as mentioned above, the driving pin 51c of the reverse fork 51 is away from one inner side surface (the upper inner side surface in FIG. 2) of the driven hole 55b of the reverse arm 55. This state is represented by the origin on the diagram of FIG. 4.

FIG. 5(b) shows the following state: the third fork shaft 32 starts its stroke from the neutral position toward the reverse shift position, and the driving pin 51c is in contact with one inner side surface of the driven hole 55b. In this state, similar to the state of FIG. 5(a), the reverse arm 55 is at the disengagement position where the protrusion 55d is in contact with the first stopper portion 53a, and the idle gear 50b is at the disengagement position. This state is represented by the point (s1, 0) on the diagram of FIG. 4.

FIG. 5(c) shows a state in which, as a result of movement of the third fork shaft 32 toward the reverse shift position, the reverse fork 51 is moved further; in this state, the reverse arm 55 is pressed upward by the driving pin 51c in contact with the one inner side surface of the driven hole 55b and starts to pivot against the urging force of the jump-over mechanism JO. As a result of the pivoting of the reverse arm 55, there is moved the idle gear 50b which has the distal end 55a of the reverse arm 55 slidably inserted into the annular groove 50b2 formed at its outer circumference, and a chamfer 50b1 at an end of the idle gear 50 comes into contact with chamfers 50a1 and 50c1 at ends of the driving gear 50a and the driven gear 50c to thereby start engagement. When the reverse arm 55 reaches a predetermined intermediate position (represented by the solid line in FIG. 5(c)) within the pivoting range of the reverse arm 55 such that the centerline of the hook hole 55e is on a plane which contains the centerlines of the support pin 54 and the hook hole 55e, the point (s3, g2) on the diagram of FIG. 4 is reached. At this point of time, since the direction of the elastic urging force applied to the reverse arm 55 from the jump-over mechanism JO changes over from the counterclockwise rotating direction to the clockwise rotating direction, an inner side surface of the driven hole 55b of the reverse arm 55 which is in contact with the driving pin 51c changes over from the one inner side surface to the other inner side surface, and the reverse arm 55 moves instantaneously from the position represented by the solid line to the position represented by the dash-dot-dot line; on the diagram of FIG. 4, an instantaneous movement to the point (s3, g3) is made.

FIG. 5(d) shows a state in which, as a result of movement of the third fork shaft 32 toward the reverse shift position, the reverse fork 51 is moved further; in this state, the reverse arm 55 urged in the clockwise rotating direction by the jump-over mechanism JO pivots further with movement of the driving pin 51c in contact with the other inner side surface of the driven hole 55b. Accordingly, the idle gear 50b is moved further, whereby the tooth engagement length between the idle gear 50b and the driving gear 50a and that between the idle gear 50b and the driven gear 50c increase. This state is represented by the point (s4, g4) on the diagram of FIG. 4.

When the third fork shaft 32 reaches the reverse shift position, as shown in FIG. 5(e), the reverse fork 51 reaches and is stopped at the reverse shift position where the end surface of the head portion 51b is in contact with the second stopper portion 53b of the reverse bracket 53, and further pivoting of the reverse arm 55 is stopped. In this state, as represented by a dash-dot-dot line 50bA of FIG. 3, the idle gear 50b is engaged with the driving gear 50a and with the driven gear 50c along its substantially overall tooth length. This state is represented by the point (s5, g5) on the diagram of FIG. 4.

Next, there is described, with reference to FIGS. 4 and 6, operations in the process of reverse-to-neutral return shift of the third fork shaft 32 moving from the reverse shift position to the neutral position. FIG. 6(a) shows a state in which the third fork shaft 32 is at the reverse shift position, and the state is similar to that shown in FIG. 5(e).

FIG. 6(b) shows a state in which the third fork shaft 32 moves toward the neutral position to a certain extent, and the head portion 51b of the reverse fork 51 is away from the second stopper portion 53b to a certain extent; in this state, the reverse arm 55 whose other inner side surface of the driven hole 55b is in contact with the driving pin 51c is pressed downward against the urging force of the jump-over mechanism JO by the driving pin 51c and is thereby pivoted. Accordingly, the idle gear 50b is returned toward a disengagement side to a certain extent, whereby the tooth engagement length between the idle gear 50b and the driving gear 50a and that between the idle gear 50b and the driven gear 50c reduce. This state is represented by the point (s4, g4) on the diagram of FIG. 4.

FIG. 6(*c*) shows a state in which, as a result of movement of the third fork shaft 32 toward the neutral position, the reverse fork 51 is moved further; in this state, the reverse arm 55 is pressed further downward by the driving pin 51c in contact with the other inner side surface of the driven hole 55b and is thereby pivoted, and the tooth engagement length between the idle gear 50b and the driving gear 50a and that between the idle gear 50b and the driven gear 50c reduce further. When the reverse arm 55 reaches a predetermined intermediate position (represented by the solid line in FIG. 6(*c*)) within the pivoting range of the reverse arm 55 such that the centerline of the hook hole 55e is on a plane which contains the centerlines of the support pin 54 and the hook hole 55e, the point (s2, g2) on the diagram of FIG. 4 is reached. At this point of time, since the direction of the elastic urging force applied to the reverse arm 55 from the jump-over mechanism JO changes over from the clockwise rotating direction to the counterclockwise rotating direction, an inner side surface of the driven hole 55b of the reverse arm 55 which is in contact with the driving pin 51c changes over from the other inner side surface to the one inner side surface, and the reverse arm 55 moves instantaneously from the position represented by the solid line to the position represented by the dash-dot-dot line; on the diagram of FIG. 4, an instantaneous movement to the point (s2, g1) is made.

FIG. 6(*d*) shows the following state: as a result of movement of the third fork shaft 32 toward the neutral position, the reverse fork 51 moves further; the reverse arm 55 reaches the disengagement position where the reverse arm 55 stops pivoting through contact of the protrusion 55d with the first stopper portion 53a; and the idle gear 50b reaches the disengagement position where the idle gear 50b is disengaged from the driving gear 50a and from the driven gear 50c. This state is represented by the point (s1, 0) on the diagram of FIG. 4.

When the third fork shaft 32 reaches the neutral position, as shown in FIG. 6(*e*), only the reverse fork 51 moves such that the driving pin 51c moves away from the one inner side surface of the driven hole 55b of the reverse arm 55, and the state shown in FIG. 5(*a*) is established again.

According to the above-described embodiment, the jump-over mechanism JO is provided between the reverse arm 55 and the transmission casing 10 and elastically urges the reverse arm 55 outward away from a predetermined intermediate position within the pivoting range of the reverse arm 55; the outside diameter of the driving pin 51c of the reverse fork 51 is smaller than the width between opposed flat inner side surfaces of a longitudinally intermediate portion of the driven hole 55b of the reverse arm 55 so as to form a gap between the driving pin 51c and the inner side surfaces of the driven hole 55b; and when the reverse arm 55 is situated on a side of the predetermined intermediate position such that the distal end portion 55a thereof is engaged with the idle gear 50b situated at the disengagement position, the driving pin 51c is elastically in contact with one of the opposed flat inner side surfaces of the longitudinally intermediate portion of the driven hole 55b, and, when the reverse arm 55 is situated on the other side of the predetermined intermediate position such that the distal end portion 55a thereof is engaged with the idle gear 50b situated at the engagement position, the driving pin 51c is elastically in contact with the other one of the opposed flat inner side surfaces of the longitudinally intermediate portion of the driven hole 55b. Thus, in reverse shift by the third fork shaft 32, the driving pin 51c of the reverse fork 51, which moves from the neutral position together with the third fork shaft 32, first comes into contact with and presses one inner side surface of the driven hole 55b, whereby the reverse arm 55 is pivoted against the urging force of the jump-over mechanism JO with movement of the reverse fork 51; when the reverse arm 55 passes a predetermined intermediate position within the pivoting range, the direction of the urging force of the jump-over mechanism JO reverses, so that the reverse arm 55 is instantaneously pivoted to a position where the other inner side surface of the driven hole 55b comes into contact with the driving pin 51c; subsequently, with the driving pin 51c held in contact with the other inner side surface of the driven hole 55b, the reverse arm 55 is pivoted with movement of the reverse fork 51.

In this manner, in the midst of pivoting, the reverse arm 55 of the present embodiment is instantaneously pivoted forward by an amount corresponding to the difference between the outside diameter of the driving pin 51c and the width between the opposed inner side surfaces of the driven hole 55b, and, in the other stage of pivoting, the reverse arm 55 is moved together with the reverse fork 51; therefore, the pivoting angle of the reverse arm 55 is greater by the angle of instantaneous pivoting than that in the aforementioned conventional technique in which the driving pin 34c is inserted between the opposed inner side surfaces of the elongated hole 43b formed in the reverse arm 43 with substantially no gap between the driving pin and the inner side surfaces. Thus, in the case where the reverse forks 51 and 34 have the same amount of movement, the reverse arm 55 and the idle gear 50b are greater in the amount of movement than those in the aforementioned conventional technique; therefore, the overall tooth length including the engaging length of the idle gear 50b can be increased accordingly, and the strength of the idle gear 50b can thereby be ensured.

According to the above-described embodiment, the reverse fork 51 is connected to the third fork shaft 32 which operates the third changeover clutch mechanism 27 for performing selective changeover of power transmission between the counter shaft 16 and the output shaft 17 through the 5th-gear pair 23, in such a manner as to be not moved when the third fork shaft 32 is shifted, from its neutral position, in a direction to operate the third changeover clutch mechanism 27, and in such a manner as to be moved together with the third fork shaft 32 when the third fork shaft 32 is shifted, from its neutral position, in an opposite direction toward a reverse shift position, and the third changeover clutch mechanism 27 includes a synchronizing mechanism for synchronizing the counter shaft 16 and the output shaft 17 at a predetermined change gear ratio of the 5th-gear pair 23 at an early stage of shift stroke, irrespective of the direction of shift by the third fork shaft 32. Through employment of this configuration, the reverse fork 51 is operated by the third fork shaft 32 which operates the third changeover clutch mechanism 27, thereby eliminating need to use a dedicated fork shaft for operating the reverse fork 51 and thus simplifying the structure. Also, since the reverse fork 51 is not moved when the third fork shaft 32 is shifted in a direction to operate the third changeover clutch mechanism 27, the reverse fork 34, the reverse arm 43, and the idle gear 24b can be reduced in the amount of movement, thereby reducing the risk of interference of these members with peripheral members, such as the shift bracket 12.

The above-described embodiment uses a so-called lever-type synchronous engaging mechanism as the synchronizing mechanism of the third changeover clutch mechanism 27 for synchronizing the counter shaft 16 and the output shaft 17 at a predetermined change gear ratio at an early stage of shift stroke even when the third fork shaft 32 is shifted in either direction. Through employment of such a synchronizing mechanism, even when the third fork shaft 32 is shifted in either direction, the counter shaft 16 and the output shaft 17 are synchronized at a predetermined change gear ratio through a single synchronizer ring, whereby the structure is simplified. However, the present invention is not limited thereto. The third changeover clutch mechanism 27 may perform synchronization through use of two synchronizer rings corresponding to the directions of shift.

According to the above-described embodiment, there is further provided the reverse bracket 53 fixed to the transmission casing 10 and having the first stopper portion 53a and the second stopper portion 53b disposed opposite to each other and the connection portion 53c integrally connecting the first and second stopper portions 53a and 53b; a proximal end portion of the reverse arm 55 is pivotally supported by the support pin 54 provided on the connection portion 53c; and the reverse arm 55 elastically urged by the jump-over mechanism JO as mentioned above is positioned and stopped at the disengagement position of the idle gear 50b through contact of the protrusion 55d provided on a portion of the reverse arm 55 with the first stopper portion 53a, and is positioned and stopped at the engagement position of the idle gear 50b through contact of one side surface of the driven hole 55b with the driving pin 51c of the reverse fork 51 stopped through contact with the second stopper portion 53b. Thus, since the reverse bracket 53, the reverse arm 55, and the jump-over mechanism JO can be attached to the transmission casing 10 in the form of a single subassembly, assembling is facilitated. Also, since the first and second stopper portions 53a and 53b restrict the pivoting range of the reverse arm 55 which the jump-over mechanism JO elastically urges in an outward direction away from the predetermined intermediate position, the risk of interference of the reverse arm 55 with peripheral members is reduced.

According to the above-described embodiment, positioning and stopping of the reverse arm 55 through contact of the protrusion 55d with the first stopper portion 53a is performed before the one fork shaft 32 returns to its neutral position, and, upon return of the one fork shaft 32 to the neutral position, the driving pin 51c moves away from one flat inner side surface of the driven hole 55b. Through employment of such a configuration, when the third fork shaft 32 is moved from its neutral position toward a reverse side, the reverse arm 55 is not pivoted until the driving pin 51c of the reverse fork 51 comes into contact with one inner side surface of the driven hole 55b; therefore, the idle gear 50b of the reverse gear train 50 is also not moved. Therefore, the tooth-end-to-tooth-end distance at the neutral position along the gear moving direction between the idle gear 50b and the driving gear 50a or the driven gear 50c can be reduced by an amount corresponding to a stroke of the reverse fork 51 until establishment of the contact of the driving pin 51c with the one inner side surface of the driven hole 55b. Accordingly, the tooth length of the idle gear 50b can be increased by an amount corresponding to the reduction of the distance, whereby the strength of the idle gear 50b can be ensured.

This is described below with reference to FIG. 4. At an early stage of shift stroke of the reverse fork 34, the counter shaft 16 and the output shaft 17 are synchronized at a predetermined change gear ratio, and the stroke position of the reverse fork 34 is a synchronization completion position Sf shown in FIG. 4. At the synchronization completion position Sf, the stroke position of the idle gear 50b of the reverse shift device according to the present invention is Ga, whereas the stroke position of the idle gear 24b of the conventional reverse shift device having been described with reference to FIGS. 7 to 10 is Gb. Meanwhile, a stroke position (engagement start position) where the idle gear 50b (or 24b) starts to be engaged with one of the driving gear 50a (or 24a) and the driven gear 50c (or 24c) (one to be engaged later in the case where the idle gear is not simultaneously engaged with the driving and driven gears) is Gs, and, at the synchronization completion position Sf, the stroke positions Ga and Gb of the idle gears 50b and 24b of the present invention and the conventional technique lead the engagement start position Gs by differences L1 and L2, respectively. In order to prevent the occurrence of gear rattle at changeover to reverse, the differences L1 and L2 must assume a certain predetermined value or greater. However, the differences L1 and L2 slightly in excess of the predetermined value will suffice; i.e., an unnecessarily large lead is not required. Therefore, in the case of the idle gear 50b of the reverse shift device according to the present invention, even though the distance of the position of the chamfer 50b1 at its end is extended by the differential distance "L1−L2" so as to bring the stroke position Ga to the stroke position Gb, the yielded effect of preventing the occurrence of gear rattle can be to such an extent as to be similar to that yielded by the conventional technique which has been described with reference to FIGS. 7 to 10. Also, the tooth length of the idle gear 50b can be increased by the extension, whereby the strength of the idle gear 50b can be ensured. In the above description, the synchronization completion position Sf is located between the stroke positions s1 and s2 of the reverse fork 51. However, the present invention is not limited thereto. The synchronization position Sf may lead the stroke position s1 or may lag behind the stroke position s2.

Furthermore, according to the above-described embodiment, the jump-over mechanism JO includes the hook hole 55e formed in the reverse arm 55 in parallel with the support pin 54 at a position located away from the support pin 54, the hook hole 53e formed in parallel with the hook hole 55e in a portion of the reverse bracket 53 which, when the reverse arm 55 is at the predetermined intermediate position within its pivoting range, is on a plane which contains the centerlines of the support pin 54 and the hook hole 55e, and the torsion coil spring 56 whose opposite ends are extended outward and bent to be hooked into the respective hook holes 55e and 53e. Thus, since the jump-over mechanism JO is composed substantially of a single spring 56 only, the structure of the jump-over mechanism JO can be very simple.

Figure 11:
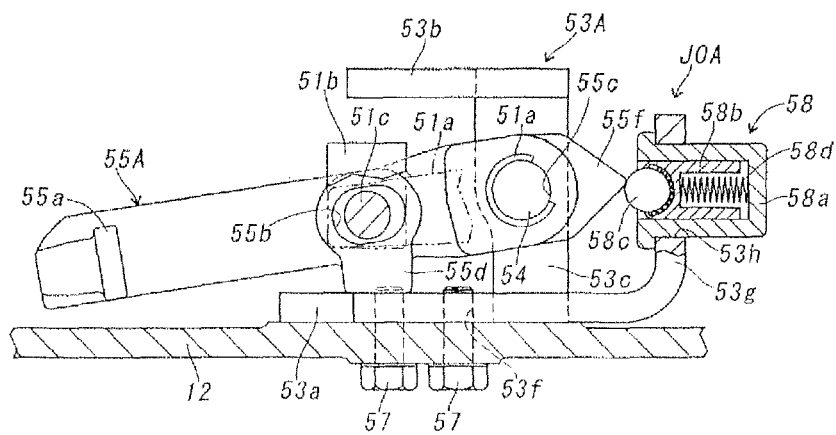
FIG. 11 View showing a modified jump-over mechanism of the transmission according to the present invention.

However, the jump-over mechanism JO is not limited in structure to the above-mentioned structure, but may have the structure shown in FIG. 11. The modified jump-over mechanism JOA includes a chevron cam portion 55f formed at the outer circumference of a proximal end portion of a reverse arm 55A and protruding radially, and an urging means 58 attached to a protruding portion 53g extending in a bent manner from the first stopper portion 53a of the reverse bracket 53A in a direction opposite the distal end portion 55a of a reverse arm 55A. The urging means 58 is configured as follows: a slider 58b is slidably fitted to an inner circumferential surface of a closed-bottomed cylindrical holder 58a having a flange formed at an open end; a coil spring 58d elastically urges the slider 58b in an outward direction; and a ball 58c is rotatably held at the distal end of the slider 58b. The urging means 58 is assembled as follows: before the support pin 54 is fixed through crimping, the holder 58a is inserted into a mounting hole 53h formed in the protruding portion 53g from a side toward the reverse arm 55A until the flange of the holder 58a hits against the protruding portion 53g; then, the ball 58c is fitted to the holder 58a in such a manner that the coil spring 58d presses the ball 58c against the cam portion 55f. The angle of the cam portion 55f with the reverse arm 55A is established such that, when the reverse arm 55A is situated at a predetermined intermediate position within its pivoting range, the apex of the cam portion 55f is in contact with the ball 58c. Through establishment of such an angle, the jump-over mechanism JOA elastically urges the reverse arm 55A outward away from a predetermined intermediate position within the pivoting range of the reverse arm.

The invention claimed is:

1. A reverse shift device in a transmission comprising: a counter shaft and an output shaft supported rotatably and in parallel with each other within a transmission casing, a plurality of speed change gear pairs and a reverse gear train for performing power transmission between the counter shaft and the output shaft, and a shift mechanism for performing selective changeover of power transmission between the counter shaft and the output shaft through the speed change gear pairs and the reverse gear train, the reverse gear train comprising a driving gear and a driven gear provided on the counter shaft and the output shaft and rotating with the counter shaft and the output shaft, respectively, and an idle gear supported in such a manner as to be rotatable and movable in an axial direction by a support shaft provided on the transmission casing in parallel with the counter shaft and the output shaft, the shift mechanism comprising a reverse arm whose proximal end portion is supported on the transmission casing in such a manner as to be pivotable about an axis orthogonal to the support shaft, whose distal end portion is slidably inserted into an annular groove formed in an outer circumference of the idle gear, and which has a driven hole formed in an intermediate portion thereof, elongated in a direction connecting the proximal end portion and the distal end portion, and extending through the intermediate portion in a direction parallel to the axis orthogonal to the support shaft, and a reverse fork supported on the transmission casing in such a manner as to be movable in parallel with the support shaft and having a driving pin engaged with the driven hole, and the idle gear being moved in an axial direction of the support shaft between an engagement position where the idle gear is engaged with the driving and driven gears, and a disengagement position where the idle gear is disengaged from the driving and driven gears, by means of moving the reverse fork in the axial direction and thereby pivoting the reverse arm, the reverse shift device having a jump-over mechanism is provided between the reverse arm and the transmission casing and elastically urges the reverse arm outward away from a predetermined intermediate position within a pivoting range of the reverse arm, an outside diameter of the driving pin of the reverse fork is smaller than a width between opposed flat inner side surfaces of a longitudinally intermediate portion of the driven hole of the reverse arm so as to form a gap between the driving pin and the inner side surfaces of the driven hole, and when the reverse arm is situated on a side of the predetermined intermediate position such that the distal end portion thereof is engaged with the idle gear situated at the disengagement position, the driving pin is elastically in contact with one of the opposed flat inner side surfaces of the longitudinally intermediate portion of the driven hole, and, when the reverse arm is situated on the other side of the predetermined intermediate position such that the distal end portion thereof is engaged with the idle gear situated at the engagement position, the driving pin is elastically in contact with the other one of the opposed flat inner side surfaces of the longitudinally intermediate portion of the driven hole, wherein the output shaft is connected to an input shaft, which is rotatably driven by an engine via a clutch rotatably coupled to another end of the input shaft, the output shaft is connected to driving wheels at another end of the output shaft, and the countershaft is a shaft to which a rotation of the input shaft is transmitted at all times via a transmission gear pair.

2. A reverse shift device in a transmission according to claim 1, wherein the reverse fork is connected to one fork shaft which operates one changeover clutch mechanism for performing selective changeover of power transmission between the counter shaft and the output shaft through any one of the speed change gear pairs, in such a manner as to be not moved when the one fork shaft is shifted, from its neutral position, in a direction to operate the one changeover clutch mechanism, and in such a manner as to be moved together with the one fork shaft when the one fork shaft is shifted, from its neutral position, in an opposite direction toward a reverse shift position, and the one changeover clutch mechanism comprises a synchronizing mechanism for synchronizing the counter shaft and the output shaft at a predetermined change gear ratio at an early stage of shift stroke, irrespective of the direction of shift by the one fork shaft.

3. A reverse shift device in a transmission according to claim 2, further comprising a reverse bracket fixed to the transmission casing and having a first stopper portion and a second stopper portion disposed opposite to each other and a connection portion integrally connecting the first and second stopper portions, wherein a proximal end portion of the reverse arm is pivotally supported by a support pin provided on the connection portion, and the reverse arm elastically urged by the jump-over mechanism is positioned and stopped at the disengagement position of the idle gear through contact of a protrusion provided on a portion of the reverse arm with the first stopper portion, and is positioned and stopped at the engagement position of the idle gear through contact of the reverse fork with the second stopper portion with the driving pin elastically in contact with the other one of the opposed flat inner side surfaces of the driven hole.

4. A reverse shift device in a transmission according to claim 3, wherein positioning and stopping of the reverse arm through contact of the protrusion with the first stopper portion is performed before the one fork shaft returns to its neutral position, and, upon return of the one fork shaft to the neutral position, the driving pin moves away from one flat inner side surface of the driven hole.

5. A reverse shift device in a transmission according to claim 3, wherein the jump-over mechanism comprises a hook hole formed in the reverse arm in parallel with the support pin at a position located away from the support pin, a hook hole formed in parallel with the hook hole of the reverse arm in a portion of the reverse bracket which, when the reverse arm is at the predetermined intermediate position within its pivoting range, is on a plane which contains the centerlines of the support pin and the hook hole of the reverse arm, and a torsion coil spring whose opposite ends are extended outward and bent to be hooked into the respective hook holes.

\* \* \* \* \*